United States Patent
Chong et al.

(10) Patent No.: US 9,670,846 B2
(45) Date of Patent: Jun. 6, 2017

(54) ENHANCED MIXING TUBE ELEMENTS

(71) Applicant: General Electric Company, Schenectady, NY (US)

(72) Inventors: Yon Han Chong, Greenville, SC (US); Dereck Joseph Ouellet, Pelzer, SC (US)

(73) Assignee: General Electric Company, Schenectady, NY (US)

( * ) Notice: Subject to any disclaimer, the term of this patent is extended or adjusted under 35 U.S.C. 154(b) by 523 days.

(21) Appl. No.: 13/952,723

(22) Filed: Jul. 29, 2013

(65) Prior Publication Data
US 2015/0028133 A1    Jan. 29, 2015

(51) Int. Cl.
*F23R 3/28*    (2006.01)
*F02C 7/22*    (2006.01)
*F23R 3/14*    (2006.01)

(52) U.S. Cl.
CPC .............. *F02C 7/222* (2013.01); *F23R 3/14* (2013.01); *F23R 3/286* (2013.01); *F05D 2220/32* (2013.01); *F23D 2900/14701* (2013.01)

(58) Field of Classification Search
CPC .... F23R 3/12; F23R 3/286; F23R 3/32; F23D 3/22; F23D 14/02; F23D 2203/007
See application file for complete search history.

(56) References Cited

U.S. PATENT DOCUMENTS

| | | | | |
|---|---|---|---|---|
| 5,140,820 A | * | 8/1992 | Booz | F23R 3/12 60/737 |
| 8,028,529 B2 | * | 10/2011 | Venkataraman | F23R 3/06 165/169 |
| 8,268,027 B2 | * | 9/2012 | Gatt | F23D 3/02 48/127.5 |
| 8,850,820 B2 | * | 10/2014 | Milosavljevic | F23C 7/004 60/737 |
| 2007/0204624 A1 | * | 9/2007 | Smith | F02C 7/22 60/773 |
| 2011/0265482 A1 | | 11/2011 | Parsania et al. | |
| 2012/0079829 A1 | | 4/2012 | Berry et al. | |
| 2013/0067923 A1 | | 3/2013 | Overby et al. | |

* cited by examiner

*Primary Examiner* — Arun Goyal
(74) *Attorney, Agent, or Firm* — Eversheds Sutherland (US) LLP

(57) ABSTRACT

The present application provides a fuel nozzle for use with a flow of air and a flow of fuel in a gas turbine engine. The fuel nozzle may include a plenum, a mixing tube element positioned within the plenum, and an enhanced mixing feature positioned within the mixing tube element so as to promote mixing of the flow of air and the flow of fuel. The enhanced mixing feature may include a turbulated mixing zone.

4 Claims, 5 Drawing Sheets

ENHANCED MIXING TUBE ELEMENTS

TECHNICAL FIELD

The present application and resultant patent relate generally to gas turbine engines and more particularly relate to a fuel nozzle having mixing tube elements with enhanced mixing features therein for fast and even mixing of fuel, air, and other types of flows.

BACKGROUND OF THE INVENTION

The operational efficiency and the overall output of a gas turbine engine generally increases as the temperature of the hot combustion gas stream increases. Higher combustion gas stream temperatures, however, may produce higher levels of nitrogen oxides and other types of regulated emissions. A balancing act thus exists between the benefits of operating the gas turbine engine in an efficient temperature range while also ensuring that the output of nitrogen oxides and other types of regulated emissions remain below mandated levels. Moreover, varying load levels, transient operations, varying ambient conditions, and many other types of operational parameters also may have a significant impact on overall gas turbine output, efficiency, and emissions.

Lower emission levels of nitrogen oxides and the like may be promoted by providing for good mixing of the fuel stream and the air stream prior to combustion. Such premixing tends to reduce combustion temperature gradients and the output of nitrogen oxides.

There is thus a desire for improved fuel nozzle designs. Such improved fuel nozzle designs may promote good mixing of the flows of fuel and air therein so as to operate at higher temperatures and efficiency but with lower overall emissions and lower dynamics. Moreover, such improved fuel nozzle designs may accomplish these goals without greatly increasing overall system complexity and costs.

SUMMARY OF THE INVENTION

The present application and the resultant patent thus may provide a fuel nozzle for use with a flow of air and a flow of fuel in a gas turbine engine. The fuel nozzle may include a plenum, a mixing tube element positioned within the plenum, and an enhanced mixing feature positioned within the mixing tube element so as to promote mixing of the flow of air and the flow of fuel. The enhanced mixing feature may include a turbulated mixing zone.

The present application and the resultant patent further may provide a fuel nozzle for use with a flow of air and a flow of fuel in a gas turbine engine. The fuel nozzle may include a plenum, a mixing tube element positioned within the plenum, and an enhanced mixing feature positioned within the mixing tube element so as to promote mixing of the flow of air and the flow of fuel. The enhanced mixing feature may include a swirler.

The present application and the resultant patent further may provide a fuel nozzle for use with a flow of air and a flow of fuel in a gas turbine engine. The fuel nozzle may include a plenum, a mixing tube element positioned within the plenum, and an enhanced mixing feature positioned within the mixing tube element so as to promote mixing of the flow of air and the flow of fuel. The enhanced mixing feature may include a continuous thread.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
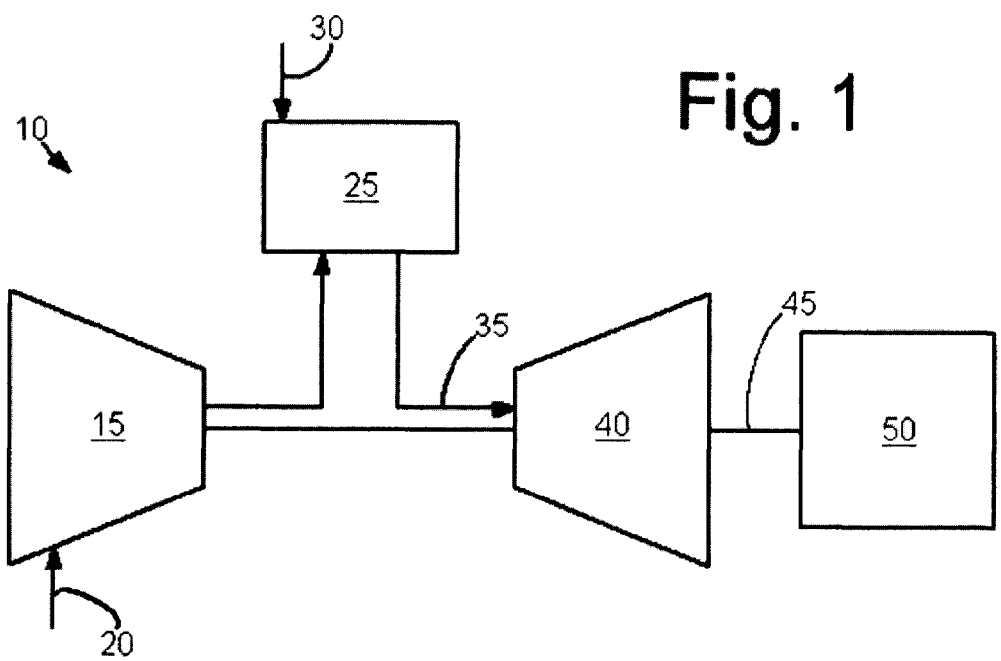
FIG. 1 a schematic diagram of a gas turbine engine showing a compressor, a combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, New York, including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
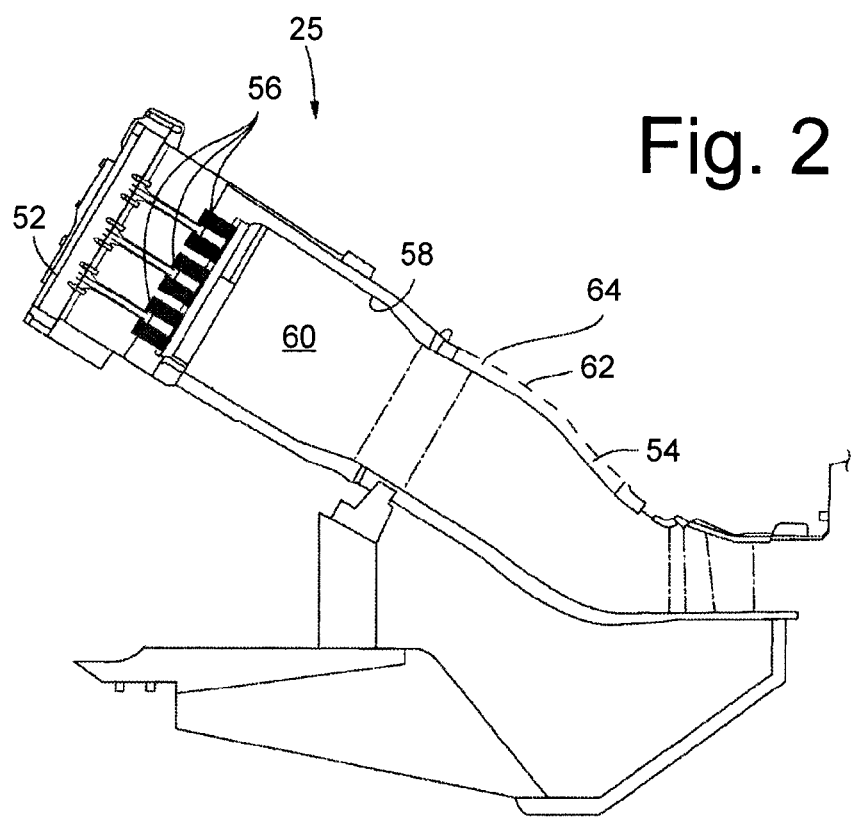
FIG. 2 is a schematic diagram of a combustor that may be used with the gas turbine engine of FIG. 1.
Figure 3:
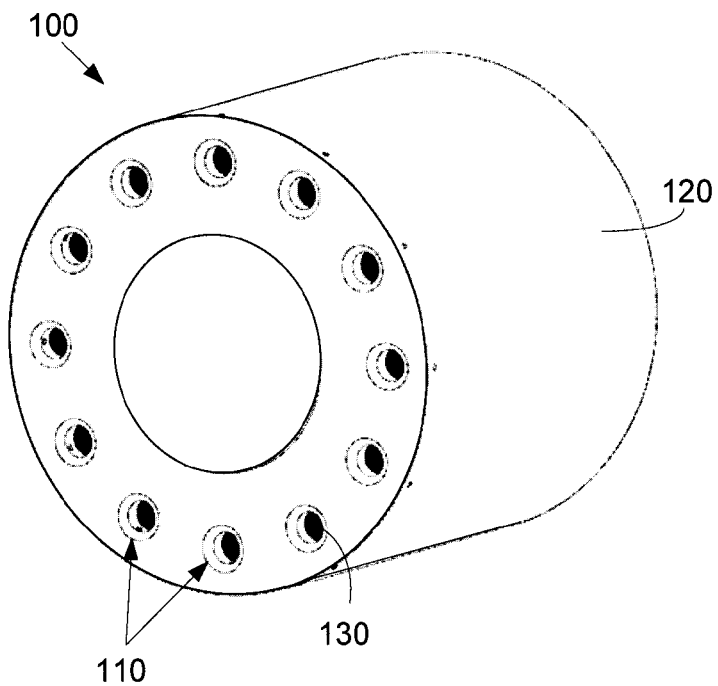
FIG. 3 is a perspective view of a portion of a fuel nozzle with a number of mixing tube elements as may be described herein.
Figure 4:
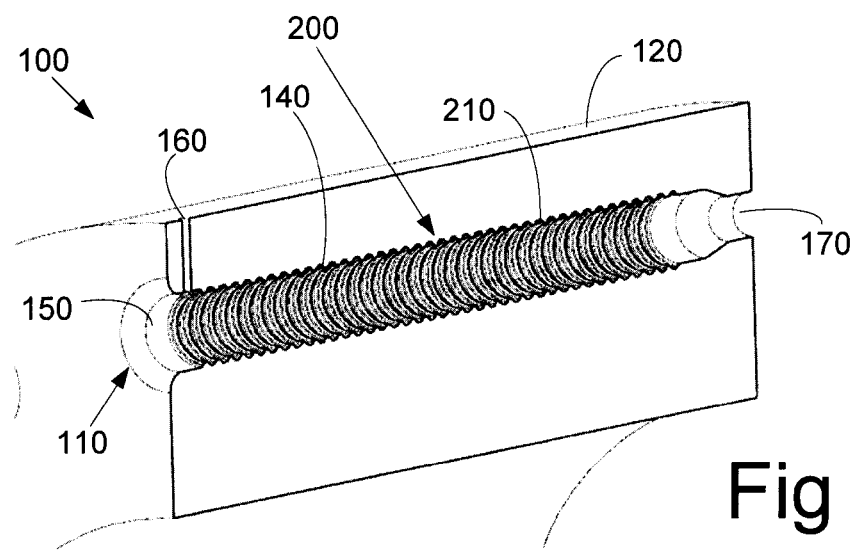
FIG. 4 is a sectional view of the fuel nozzle with the mixing tube elements of FIG. 3.
Figure 5:
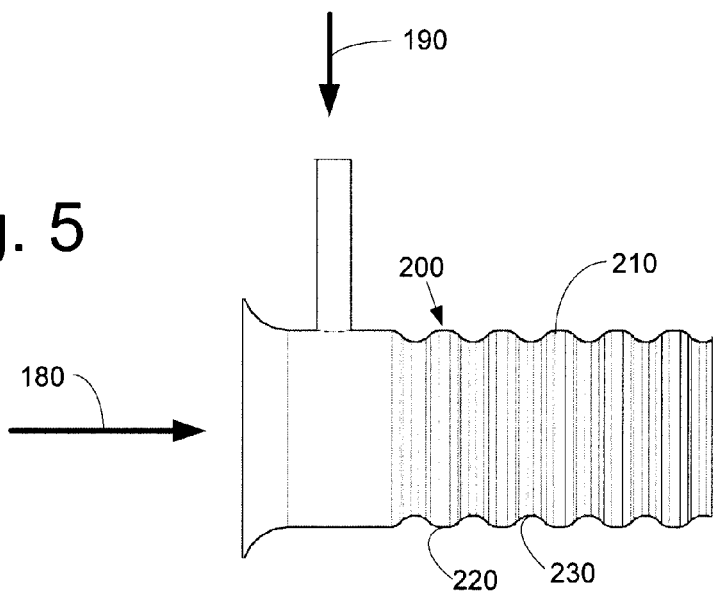
FIG. 5 is a further sectional view of a portion of the mixing tube element of FIG. 3.
Figure 6:
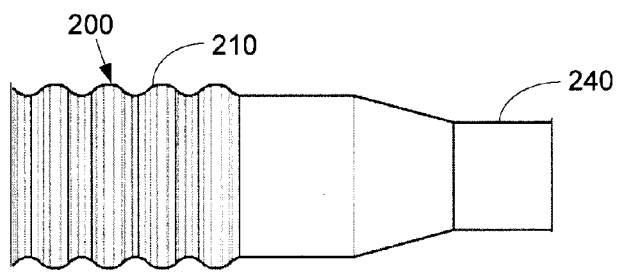
FIG. 6 is a further sectional view of a portion of the mixing tube element of FIG. 3.
Figure 7:
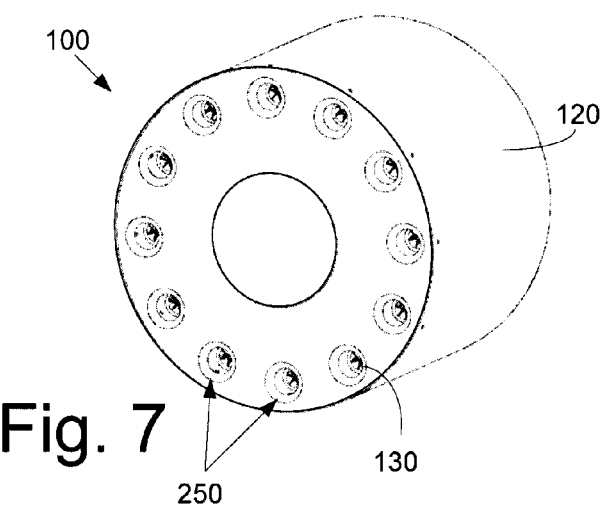
FIG. 7 is a perspective view of an alternative embodiment of a fuel nozzle with a number of mixing tube elements as may be described herein.
Figure 8:
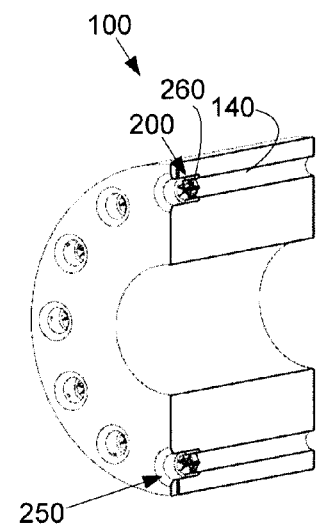
FIG. 8 is a sectional view of the fuel nozzle with the mixing tube elements of FIG. 7.
Figure 9:
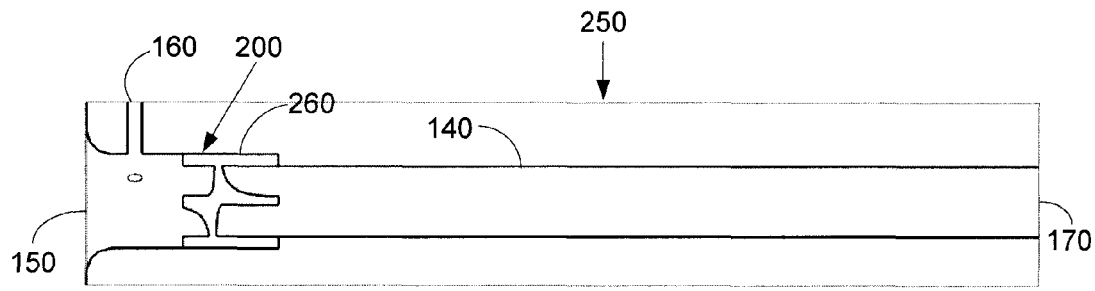
FIG. 9 is a further sectional view of a portion of the mixing tube element of FIG. 7.
Figure 10:
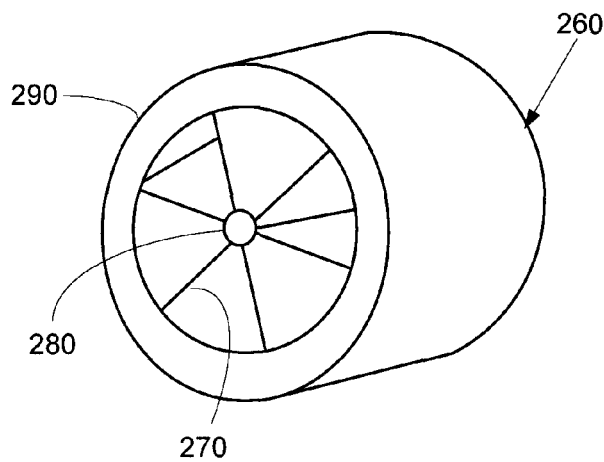
FIG. 10 is a perspective view of a swirler that may be used with the enhanced mixing tube element of FIG. 7.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. Any number of the combustors 25 may be used herein in a can-annular array and the like. The combustor 25 described herein is for the purpose of example only. Combustors with other components and other configurations may be used herein.

FIGS. 3-6 show an example of a portion of a fuel nozzle 100 that may be used with the combustor 25 and the like. The fuel nozzle 100 may include a number of mixing tube elements 110 as may be described herein. The mixing tube elements 110 may be positioned within a plenum 120 in an annular array 130. Any number of the mixing tube elements 110 may be used herein. The mixing tube elements 110 may have any size, shape, or configuration. Moreover, mixing tube elements 110 of differing sizes, shapes, and configurations also may be used herein together.

In this example, the mixing tube elements 110 may include a conduit 140 extending along the length of the plenum 120. The mixing tube elements 110 may include an air inlet 150 and a fuel inlet 160 on one end of the conduit 140 and a fuel-air outlet 170 on the other end of the conduit 140. A flow of air 20 from the compressor 15 or otherwise may enter the air inlet 150 in a first direction 180 while the flow of fuel 130 may enter the fuel inlet 160 in a perpendicular second direction 190. The use of the perpendicular second direction 190 promotes mixing of the flows. The fuel inlet 160 may be positioned downstream of the air inlet 150.

The mixing tube elements 110 also may include one or more enhanced mixing features 200. The enhanced mixing features 200 may extend along the length of the conduit 140 in whole or in part. In this example, the enhanced mixing features 200 may include a turbulated mixing zone 210. The turbulated mixing zone 210 may include alternating areas of greater diameter 220 and lesser diameter 230. Any number of the alternating areas 220, 230 may be used. The respective alternating areas 220, 230 may have any size, shape, or configuration. The differences in diameter in the alternating areas 220, 230 may vary. The turbulated mixing zone 210 promotes good mixing of the flows of air 20 and fuel 30 by creating turbulence in the flows via the alternating areas 220, 230. Different types of vortices also may be formed herein so as to further promote good mixing.

The fuel-air outlet 170 of the mixing tube elements 110 may include a constricted tip 240. The constricted tip 240 may be an area of narrowing diameter. The narrowing diameter serves to accelerate the mixed fuel-air flow as it exits the mixing tube element 110 so as to mitigate the potential for recirculation and possible flame holding. The constricted tip 240 may have any size, shape, or configuration. Other components and other configurations may be used herein.

FIGS. 7-10 show a further example of a mixing tube element 250 as may be described herein. The mixing tube element 250 may include the enhanced mixing features 200 in the form of a swirler 260. The swirler 260 may include a number of vanes 270 extending from a central hub 280 to an outer shell 290. The vanes may be angled. The swirler 260 may have any size, shape, or configuration. The swirler 260 may be pressed fit into the conduit 140 downstream of the air inlet 150 and the fuel inlet 160. Other types of connection means may be used herein. The swirler 260 provides swirl to the flow of air 20 and the flow of fuel 30 so as to promote good mixing. More than one swirler 260 may be used herein. Other components and other configurations may be used herein.

Figure 11:
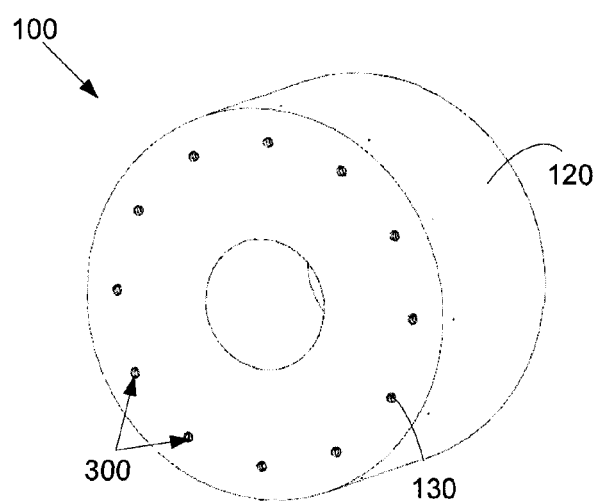
FIG. 11 is a perspective view of a further embodiment of a fuel nozzle with a number of mixing tube elements as may be described herein.
Figure 12:
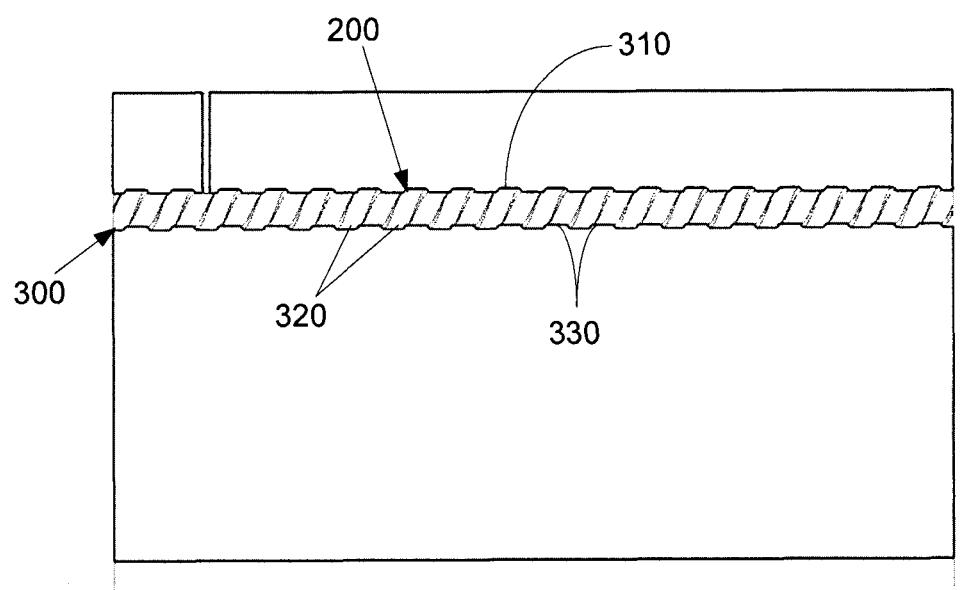
FIG. 12 is a sectional view of a fuel nozzle with the mixing tube elements of FIG. 11.

FIGS. 11 and 12 show a further embodiment of a mixing tube element 300. In this example, the mixing tube element 300 may include the enhanced mixing features 200 in the form of a continuous thread 310. The continuous thread 310 may extend along the length of the conduit 140 in whole or in part. Multiple threads 310 may be used herein. The continuous thread 310 may include alternating areas of greater diameter 320 and lesser diameter 330. The thread 310 and the alternating areas 320, 330 may be continuous or intermittent. The continuous thread 310 and the alternating areas 320, 330 may have any size, shape, or configuration. The continuous thread 310 serves to disrupt the flow of air 20 and the flow of fuel 30 for good mixing. Other components and other configurations may be used herein.

The mixing tube elements 110 described herein thus use the enhanced mixing features 200 to create swirl and increase turbulence in the flows of air 20 and fuel 30 so as to accelerate and promote good mixing. Enhanced mixing promotes efficient and cleaner combustion. Moreover, such good mixing may permit the use of shorter or fewer mixer tube elements 110 so as to provide more compact hardware design possibilities. Different types of enhanced mixing features 200 may be used within a single mixing tube element 110. Moreover, the use of the constricted tip 240 may accelerate the fuel-air flow so as to mitigate the potential for recirculation and flame holding.

Although the enhanced mixing features 200 have been described in the context of mixing air and fuel in a fuel nozzle, any type of mixture may be mixed quicker and/or more evenly as compared to a straight tube. The enhanced mixing features 200 thus help overcome the Coandă effect and the like, i.e., the tendency of a fluid jet to be attracted to a nearby surface. This includes gas/gas mixtures, gas/liquid mixtures, liquid/liquid mixtures, solid particles in other solid particles, and the like. Moreover, chemical processes requiring a substantially even mixture of elements also may benefit herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fuel nozzle for use with a flow of air and a flow of fuel in a gas turbine engine, comprising:
    a fuel nozzle body;
    a plurality of elongated mixing tubes positioned within and extending through the fuel nozzle body in an annular array, wherein each of the elongated mixing tubes comprise a fuel inlet and an air inlet, wherein the fuel inlet is positioned downstream from and perpendicular to the air inlet, wherein the flow of fuel and the flow of air mix within the elongated mixing tubes;
    a turbulated mixing zone comprising alternating areas of greater diameter and lesser diameter extending along an axial length of an inner surface of each the elongated mixing tubes to promote mixing of the flow of air and the flow of fuel; and a constricted tip disposed at an air-fuel outlet of each of the elongated mixing tubes.

2. The fuel nozzle of claim 1, wherein the plurality of elongated mixing tubes each comprise a conduit.

3. The fuel nozzle of claim 1, wherein the turbulated mixing zone comprises a continuous thread.

4. The fuel nozzle of claim 3, wherein the turbulated mixing zone comprises a plurality of continuous threads.

* * * * *